US010180160B2

(12) United States Patent
Inoue et al.

(10) Patent No.: US 10,180,160 B2
(45) Date of Patent: Jan. 15, 2019

(54) HUB UNIT

(71) Applicant: JTEKT CORPORATION, Osaka-shi, Osaka (JP)

(72) Inventors: Yuya Inoue, Nagaokakyo (JP); Takaaki Onizuka, Kashiwara (JP); Toshihiro Hakata, Kashiwara (JP); Teruyuki Wakisaka, Nagoya (JP); Takuya Toda, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/686,642

(22) Filed: Aug. 25, 2017

(65) Prior Publication Data

US 2018/0066699 A1    Mar. 8, 2018

(30) Foreign Application Priority Data

Sep. 2, 2016  (JP) ................................ 2016-171418
Aug. 5, 2017  (JP) ................................ 2017-152070

(51) Int. Cl.
*F16C 19/18*   (2006.01)
*F16C 33/72*   (2006.01)
(Continued)

(52) U.S. Cl.
CPC .......... *F16C 19/184* (2013.01); *F16C 33/586* (2013.01); *F16C 33/783* (2013.01);
(Continued)

(58) Field of Classification Search
CPC .. F16C 19/184; F16C 19/386; F16C 33/7886; F16C 19/186; F16C 33/586;
(Continued)

(56) References Cited

U.S. PATENT DOCUMENTS 7,618,191 B2 * 11/2009 Haepp ................... F16C 19/185
                                                    384/448
7,806,597 B2 * 10/2010 Langer ................ B60B 27/0005
                                                    384/544
(Continued)

FOREIGN PATENT DOCUMENTS

DE    102014208422 A1 * 11/2015  ......... B60B 27/0073
JP       2008101662 A  *  5/2008  ............ F16C 19/186
(Continued)

*Primary Examiner* — Marcus Charles
(74) *Attorney, Agent, or Firm* — Oliff PLC

(57) ABSTRACT

A hub unit includes an outer ring, an inner shaft, rolling elements and a sealing device. The outer ring includes an outer ring body and an outer ring flange. The inner shaft includes an inner shaft body and an inner shaft flange. The outer ring body includes a first portion and a second portion. The first portion is an end part on the outer side of the outer ring body. The second portion is a part of the outer ring body between the first portion and the outer ring flange. The second portion includes an upper build-up portion. The upper build-up portion is formed in an upper part of the second portion and a thickness of the build-up portion is larger than thicknesses of side parts of the second portion. An upper end of the upper build-up portion is higher than an upper end of the first portion.

5 Claims, 11 Drawing Sheets

(51) Int. Cl.
 *F16C 33/78* (2006.01)
 *F16C 33/58* (2006.01)
 *B60B 27/00* (2006.01)
(52) U.S. Cl.
 CPC ...... *F16C 33/7886* (2013.01); *B60B 27/0005* (2013.01); *F16C 19/186* (2013.01); *F16C 2326/02* (2013.01)
(58) Field of Classification Search
 CPC .. F16C 2326/02; F16F 33/48; B60B 27/0005; B60B 27/0078
 USPC ........ 384/477, 504, 512–513, 544, 583, 589
 See application file for complete search history.

(56) References Cited

U.S. PATENT DOCUMENTS

| | | | |
|---|---|---|---|
| 7,837,392 B2 * | 11/2010 | Niebling | B60B 27/0005 384/544 |
| 8,523,447 B2 * | 9/2013 | Langer | B60B 27/0005 384/477 |
| 8,714,829 B2 * | 5/2014 | Hirai | B60B 27/0005 29/898.13 |
| 8,745,874 B2 * | 6/2014 | Kubota | B60B 27/00 29/898.042 |
| 2009/0148091 A1 * | 6/2009 | Kametaka | B60B 27/0005 384/544 |
| 2009/0232435 A1 * | 9/2009 | Ohtsuki | B60B 27/0005 384/544 |
| 2010/0254643 A1 * | 10/2010 | Komori | B60B 27/0005 384/480 |

FOREIGN PATENT DOCUMENTS

| | | | | |
|---|---|---|---|---|
| JP | 2010-137629 A | | 6/2010 | |
| JP | 2012-148591 A | | 8/2012 | |
| JP | 2012116429 A | * | 6/2016 | .......... F16C 33/7876 |
| KR | 1509165 B1 | * | 4/2015 | .............. F16C 33/16 |

* cited by examiner

HUB UNIT

INCORPORATION BY REFERENCE

The disclosure of Japanese Patent Application No. 2017-152070 filed on Aug. 5, 2017 including the specification, drawings and abstract is incorporated herein by reference in its entirety.

BACKGROUND

1. Technical Field

The disclosure relates to a hub unit, and more specifically to a hub unit mounted on a vehicle.

2. Description of Related Art

A hub unit, which is a bearing device for a vehicle, is provided with an inner shaft, an outer ring, and a plurality of rolling elements. An inner ring is fixed to an end part of the inner shaft on an inner side of a vehicle. The inner shaft and the inner ring have raceway surfaces on their outer peripheries, respectively. The outer ring has a raceway surface in its inner periphery, corresponding to the raceway surfaces of the inner shaft and the inner ring. The plurality of rolling elements is disposed on the raceway surfaces in a bearing space formed between the inner shaft and the inner ring, and the outer ring. A sealing device seals the bearing space.

The sealing device seals the bearing space from an outer side of a vehicle to block muddy water, which is wound up by a wheel and reaches the hub unit through a knuckle and so on of a suspension, so that the muddy water does not enter the bearing space. However, depending on an amount of muddy water around the sealing device, a sealing function of the sealing device can lack and muddy water can enter the bearing space.

Japanese Patent Application Publication No. 2010-137629 (JP 2010-137629 A) discloses a hub unit in which an outer ring has an elaborated shape so as to reduce an amount of water entering. In this hub unit, an inclined surface is formed in an upper part of the outer ring within a range from a base part through an outer side end of a flange. Thus, in JP 2010-137629 A, water is positively flown downwardly in order to reduce an amount of water reaching a sealing device.

Japanese Patent Application Publication No. 2012-148591 (JP 2012-148591 A) discloses a hub unit, which does not aim to restrain water from entering a bearing space but has an outer ring with an elaborated shape. The outer ring of the hub unit is formed so that its transverse sectional shape becomes elliptic within a range from a base part of a flange to an outer side end of the outer ring. The transverse section means a surface taken along a plane orthogonal to a straight line that is the axial center of the hub unit.

SUMMARY

In the hub units of JP 2010-137629A and JP 2012-148591 A, the transverse sectional shape of the outer ring does not change from the base part to the outer side end of the flange. This means that an upper surface of the outer ring has a continuous shape in an axis direction within a range from the base part to the outer side end of the flange. The transverse section is a surface taken along a plane orthogonal to a straight line, which is the axial center of the hub unit. Therefore, water flowing along a knuckle and so on flows smoothly on the upper surface of the outer ring to the outer side end. In this case, an amount of water reaching the sealing device increases, making it more likely that water enters the bearing space.

An object of the disclosure is to provide a hub unit that is able to restrain water from entering a bearing space.

A hub unit according to an aspect of the disclosure is mounted on a vehicle. The hub unit includes an outer ring, an inner shaft, a plurality of rolling elements, and a sealing device. The outer ring includes a cylindrical outer ring body and an outer ring flange. The outer ring flange protrudes radially outwardly from the outer ring body. The inner shaft includes an inner shaft body and an inner shaft flange. The inner shaft body is inserted into the outer ring body. The inner shaft flange is disposed on an outer side of the outer ring flange. The outer side is an outer side in a vehicle width direction in a state where the hub unit is mounted on the vehicle. The inner shaft flange protrudes radially outwardly from the inner shaft body. The plurality of rolling elements is disposed inside a bearing space. The bearing space is formed between the outer ring body and the inner shaft body. The sealing device seals an end part on the outer side of the bearing space. The outer ring body includes a first portion and a second portion. The first portion is an end part on the outer side of the outer ring body. The second portion is a part of the outer ring body between the first portion and the outer ring flange. The second portion includes an upper build-up portion. The upper build-up portion is formed in an upper part of the second portion so that a thickness of the upper part of the second portion is larger than thicknesses of side parts of the second portion in the state where the hub unit is mounted on the vehicle. In the state where the hub unit is mounted on the vehicle, an upper end of the upper build-up portion is higher than an upper end of the first portion.

With the hub unit according to this aspect, it is possible to restrain water from entering the bearing space.

In the state where the hub unit is mounted on the vehicle, an upper surface of the first portion may have a shape generally parallel to the axial center of the hub unit, and a surface of an outer side part of the upper build-up portion may have a shape radially inwardly inclined towards the first portion in a sectional view being taken along a plane including a straight line which is an axial center of the hub unit.

An end on the outer side of the upper build-up portion may be disposed on an outer peripheral surface of the outer ring body within a range between a first position and a second position. The first position is a position where a first straight line and the outer peripheral surface of the outer ring body intersect in a sectional plane including an axial center of the hub unit. The second position is a position on the outer side of the first position and is a position where a second straight line and the outer peripheral surface of the outer ring body intersect in a sectional plane including the axial center of the hub unit. The first straight line forms a contact angle of each of the rolling elements disposed on the outer side of the outer ring flange with a straight line which is perpendicular to the axial center of the hub unit. The second straight line is perpendicular to the axial center of the hub unit and passes an end which is on the outer side of each of the rolling elements on the outer side of the outer ring flange.

The second portion may further include a lower build-up portion. The lower build-up portion is formed in a lower part of the second portion so that a thickness of the lower part of the second portion is larger than thicknesses of side parts of the second portion in the state where the hub unit is mounted on the vehicle.

An outer peripheral portion of the sealing device may extend on an outer peripheral surface of the first portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
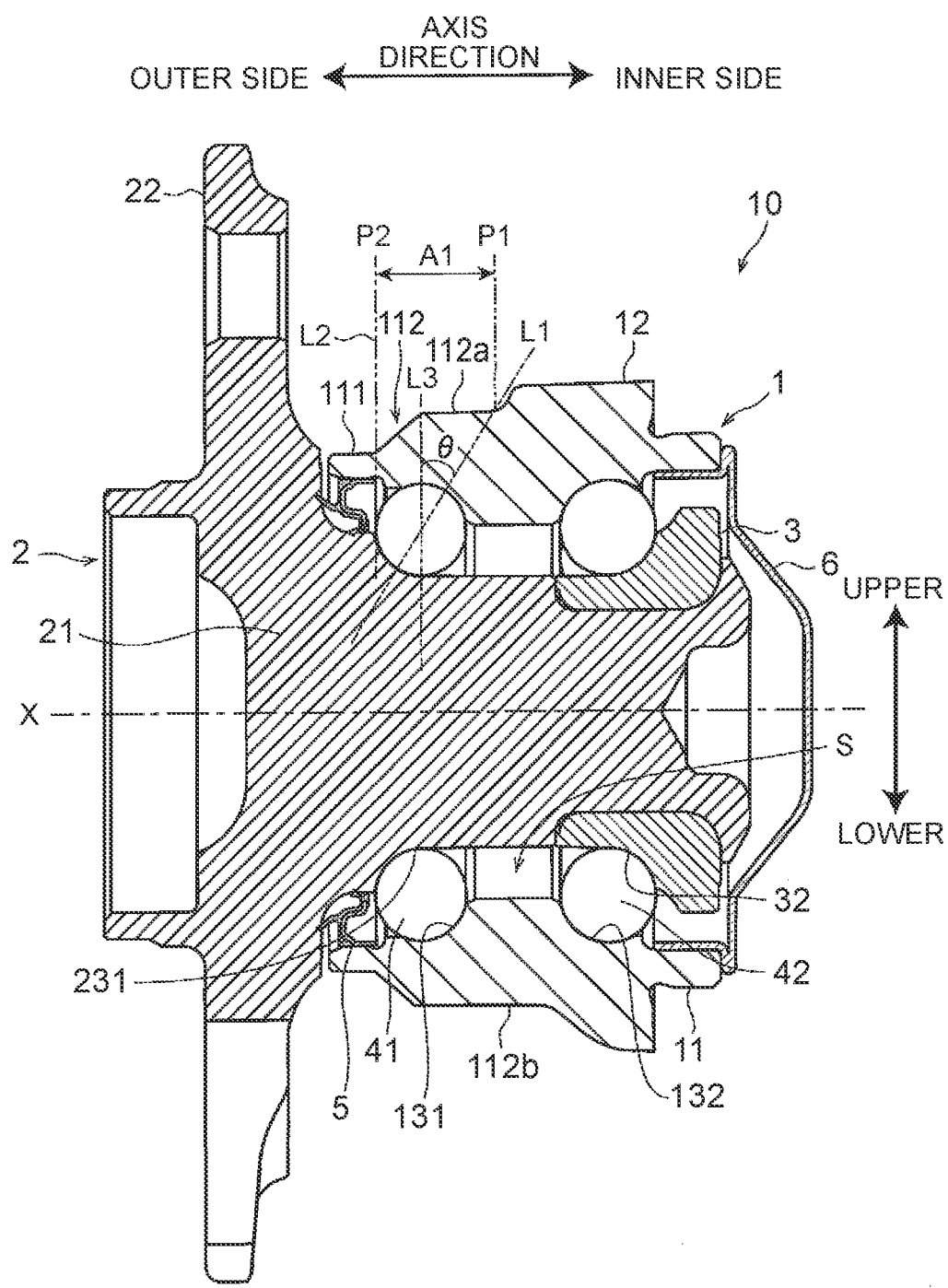
FIG. 1 is a sectional view showing a general structure of a hub unit according to the first embodiment, the sectional view being taken along a plane including a straight line, which is an axial center of the hub unit.

A hub unit according to an embodiment of the disclosure is mounted on a vehicle. The hub unit is provided with an outer ring, an inner shaft, a plurality of rolling elements, and a sealing device. The outer ring has a cylindrical outer ring body and an outer ring flange. The outer ring flange protrudes radially outwardly from the outer ring body. The inner shaft has an inner shaft body and an inner shaft flange. The inner shaft body is inserted into the outer ring body. The inner shaft flange is disposed on an outer side of the outer ring flange. The outer side is an outer side in a vehicle width direction in a state where the hub unit is mounted on the vehicle. The inner shaft flange protrudes radially outwardly from the inner shaft body. The plurality of rolling elements is disposed inside a bearing space. The bearing space is formed between the outer ring body and the inner shaft body. The sealing device seals an end part on the outer side of the bearing space. The outer ring body has a first portion and a second portion. The first portion is an end part on the outer side of the outer ring body. The second portion is a part of the outer ring body between the first portion and the outer ring flange. The second portion includes an upper build-up portion. The upper build-up portion is formed in an upper part of the second portion so that a thickness of the second portion is larger than thicknesses of side parts of the second portion in the state where the hub unit is mounted on the vehicle. In the state where the hub unit is mounted on the vehicle, an upper end of the upper build-up portion is higher than an upper end of the first portion.

According to this embodiment, the upper build-up portion is formed in the upper part of the outer ring body excluding the end part of the outer ring body on the outer side. The upper build-up portion is not formed in the end part of the outer ring body on the outer side. The upper end of the upper build-up portion is positioned higher than the upper end of the end part of the outer ring body on the outer side. Therefore, the upper surface of the outer ring body is discontinuous at a boundary part between the portion where the upper build-up portion is formed and the end part on the outer side. With this structure, when water running along a knuckle and so on flows towards the end of the outer ring body on the outer side along the upper surface of the outer ring body, force of water is reduced at the discontinuous position described above, and flow speed drops. Because of this, it is more likely that water flowing on the outer ring body falls down from the outer ring body before reaching the end of outer ring body on outer side. As a result, the hub unit according to this embodiment is able to reduce an amount of water around the sealing device, thus restraining water from entering the bearing space.

According to this embodiment, since the thickness of the upper part of the outer ring body is increased by the upper build-up portion, it is possible to improve rigidity of the outer ring.

On an outer peripheral surface of the outer ring body, the end of the upper build-up portion on the outer side may be positioned within a range between the first position and the second position that is located on the outer side of the first position. In a section taken along a plane orthogonal to an axial center of the hub unit, the first position is a position where a first straight line and the outer peripheral surface of the outer ring body intersect. The first straight line meets a straight line that is perpendicular to the axial center of the hub unit, forming a contact angle of each of the rolling elements disposed on the outer side of the outer ring flange. A contact angle means an angle which is formed by a radial plane of a bearing and a line of action of a resultant force obtained by combining a system of forces which comes from an inner shaft or an inner ring and acts on a rolling element. The radial plane of the bearing is a plane orthogonal to a central axis of the bearing. A direction of the contact angle is a direction of the line of action of the foregoing resultant force, which is obtained by combining a system of forces which comes from the inner shaft or the inner ring and acts on the rolling element. In many cases, a contact angle is determined as a designed value at the design phase of a bearing. In this kind of case, the contact angle, which is determined as a designed value, may correspond to the "contact angle" of the disclosure. The foregoing contact angle, which is determined as a designed value, may be indicated in, for example, an instruction manual, a specification, or a specification catalogue, etc. of a bearing as a product. In the section taken along the plane orthogonal to the axial center of the hub unit, the second position is a position where a second straight line and the outer peripheral surface of the outer ring body intersect. The second straight line passes the end which is on the outer side of each of the rolling elements on the outer side of the outer ring flange and is perpendicular to the axial center of the hub unit.

A load from the rolling element acts on the outer ring. The direction of the straight line, which forms the contact angle of the rolling element, is a direction of the load acting on the outer ring from the rolling element. This means that a large load acts on a part of the outer ring where the straight line passes. According to the foregoing embodiment, the upper build-up portion having a large thickness is formed in the outer ring beyond a position where the straight line, which forms the contact angle of the rolling element, intersects the outer peripheral surface of the outer ring body. Therefore, the part of the outer ring body, in which the straight line forming the contact angle of the rolling element passes, is strengthened. Thus, it is able to ensure high rigidity against a load from the rolling element.

According to this embodiment, the upper build-up portion does not extend to the outer side beyond the rolling element. This means that a thickness is not increased in a part of the outer ring body that does not contribute much to improvement of rigidity against a load form the rolling element. Therefore, the hub unit according to this embodiment is able to restrain a mass increase of the hub unit while improving rigidity of the outer ring against a load from the rolling element.

The second portion may further include a lower build-up portion. The lower build-up portion is formed in a lower part of the second portion so that a thickness of the lower part of the second portion is larger than thicknesses of side parts of the second portion in the state where the hub unit is mounted on the vehicle.

According to this embodiment, in a part of the outer ring body on the outer side of the outer ring flange, the thickness of the outer ring body on the lower side is also increased by the lower build-up portion. Thus, rigidity of the outer ring is further improved.

An outer peripheral portion of the sealing device may extend on an outer peripheral surface of the first portion.

In a hub unit according to this embodiment, the build-up part is not formed in the end part of the outer ring body on the outer side. Therefore, as described in the foregoing embodiment, the outer peripheral portion of the sealing device may extend to the outer peripheral surface of the end part of the outer ring body on the outer side, thereby improving a sealing function of the sealing device. Thus, the hub unit according to this embodiment is able to restrain water from entering the bearing space more reliably.

A hub unit according to this embodiment may be applied as a hub unit that supports a non-driving wheel, or as a hub unit that supports a driving wheel. This means that an inner shaft included in the hub unit according to this embodiment may be applied, with a structure where an insertion hole for inserting a driving shaft is formed, or a structure where an insertion hole for inserting a driving shaft is not formed.

In the hub unit according to this embodiment, the number and positions of the outer ring flanges are not particularly limited. The number and positions of the outer ring flanges may be freely designed depending on specifications of a vehicle and a wheel.

Hereinafter, embodiments are explained with reference to the drawings. The same reference numerals are used for the same or equivalent constituents in the drawings and the same explanation is not repeated. For convenience of explanation, in some cases, the structures are simplified or illustrated schematically, or partially omitted in each of the drawings.

Figure 2:
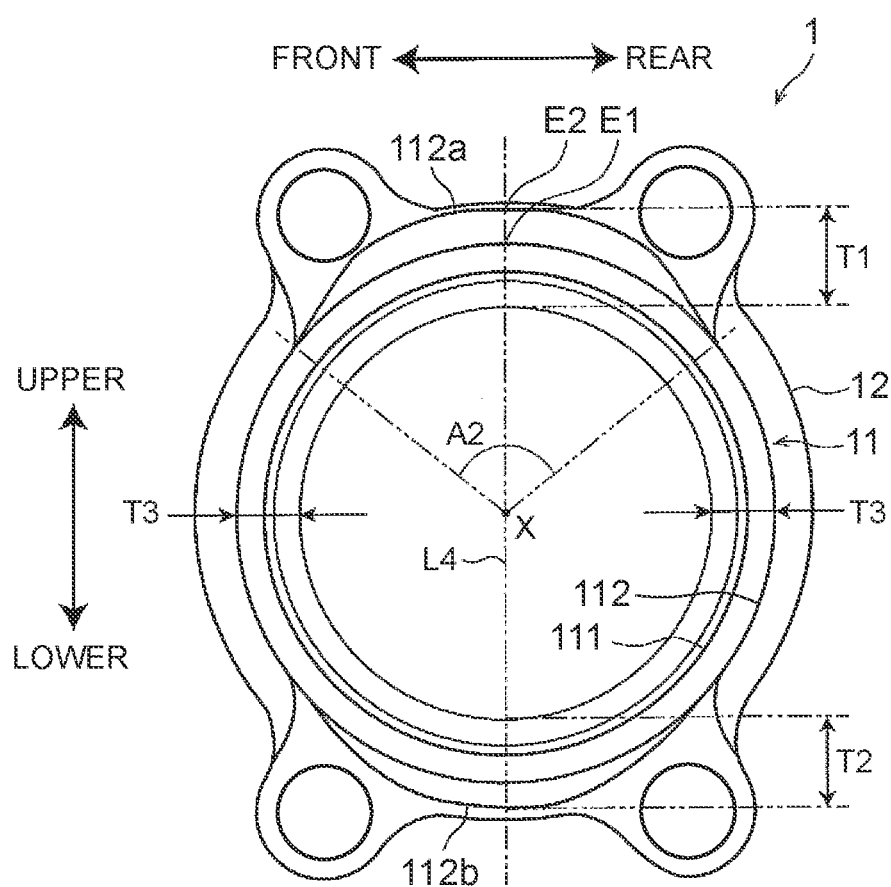
FIG. 2 is a view of an outer ring provided in the hub unit shown in FIG. 1, seen from an outer side of a vehicle.
Figure 3:
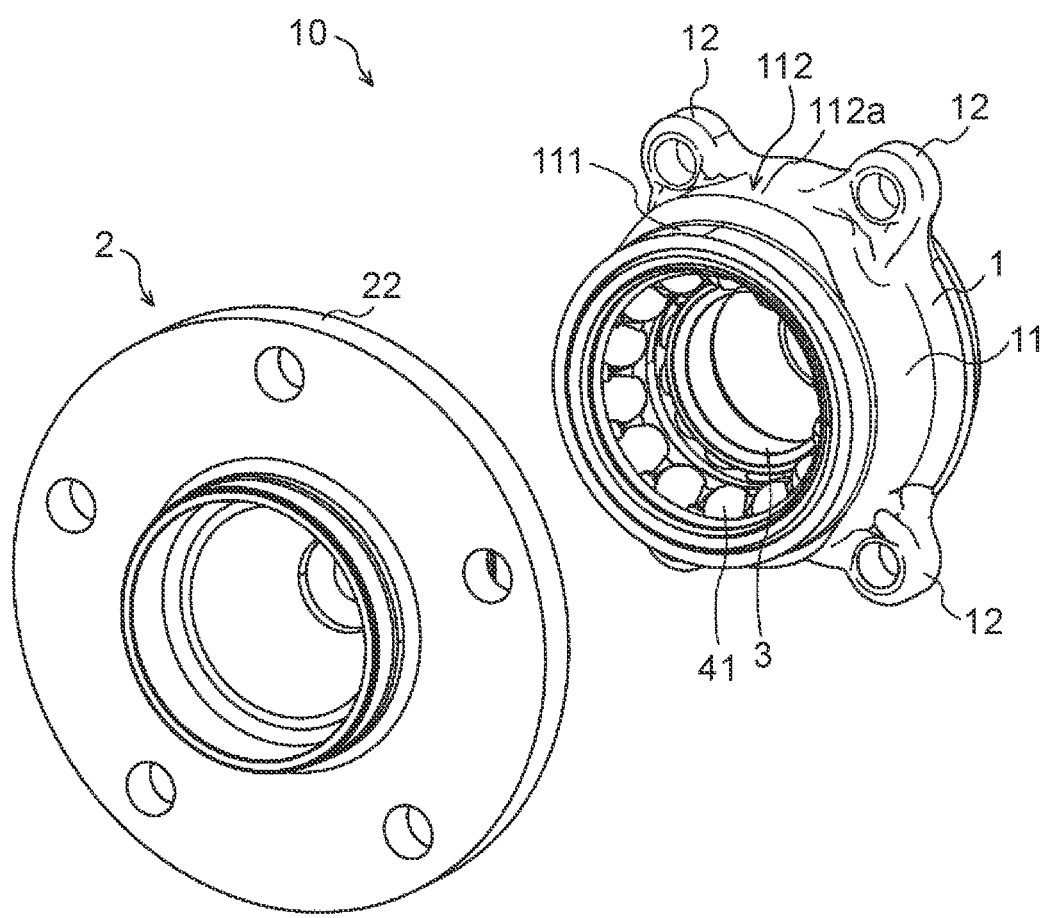
FIG. 3 is a perspective view of a state where an inner shaft is separated from the hub unit shown in FIG. 1.

FIG. 1, FIG. 2 and FIG. 3 show the first embodiment. FIG. 1 is a vertical sectional view of a hub unit 10 according to the first embodiment. Note that the vertical section is a surface taken along a plane including a straight line X that is an axial center of the hub unit 10. A transverse section means a surface taken along a plane orthogonal to the straight line X. A direction in which the straight line X extends is the axis direction of the hub unit 10. The direction in which the straight line X extends is also a width direction of a vehicle on which the hub unit 10 is mounted. Hereinafter, when the hub unit 10 is mounted on the vehicle, a side closer to a vehicle body is referred to as an inner side, and a side separated from the vehicle body is referred to as an outer side in the axis direction of the hub unit 10. Upper and lower sides in the state where the hub unit 10 is mounted on the vehicle are simply referred to as upper and lower sides. An upper and lower direction in FIG. 1 coincides with an upper and lower direction of the hub unit 10. Front and rear in a traveling direction of the vehicle on which the hub unit 10 is mounted are simply referred to as front and rear.

As shown in FIG. 1, the hub unit 10 is provided with an outer ring 1, an inner shaft 2, an inner ring 3, a plurality of rolling elements 41, 42, a sealing device 5, and a cap 6.

The outer ring 1 includes an outer ring body 11 and an outer ring flange 12. The outer ring flange 12 protrudes radially outwardly from an outer peripheral surface of the outer ring body 11. The outer ring flange 12 has a generally ring shape in which the straight line X serves as its axial center. A suspension of the vehicle (not shown) is mounted on the outer ring flange 12.

The outer ring body 11 has a generally cylindrical shape in which the straight line X serves as its axial center. Raceway surfaces 131, 132 are provided in an inner peripheral surface of the outer ring body 11. The raceway surfaces 131, 132 are ring-shaped surfaces in which the straight line X serves as their axial centers. The raceway surface 131 is disposed on the outer side of the raceway surface 132.

The outer ring body 11 includes a first portion 111 and a second portion 112. The first portion 111 and the second portion 112 are portions of the outer ring body 11 located on the outer side of the outer ring flange 12.

The first portion 111 is an end part on the outer side of the outer ring body 11. The first portion 111 has a generally cylindrical shape in which the straight line X serves as its axial center. The first portion 111 has a constant thickness over the entire circumference at an arbitrary position in the axis direction in the transverse section. This means that the first portion 111 has a transverse section having a substantially complete round ring shape, in which the straight line X serves as its axial center.

The second portion 112 is disposed on the inner side of the first portion 111. The second portion 112 is a part of the outer ring body 11 between the first portion 111 and the outer ring flange 12.

The second portion 112 includes an upper build-up portion 112a and a lower build-up portion 112b. The upper build-up portion 112a is formed in an upper part of the second portion 112. The lower build-up portion 112b is formed in a lower part of the second portion 112. In a transverse section of the second portion 112 at an arbitrary position in the axis direction, a thickness of the upper build-up portion 112a and a thickness of the lower build-up portion 112b are larger than a thickness of a part other than the upper build-up portion 112a and the lower build-up portion 112b.

The thickness of the upper build-up portion 112a and the thickness of the lower build-up portion 112b are larger than the thickness of the first portion 111. In the outer peripheral surface of the outer ring body 11, a difference in height is formed in a boundary part between the upper build-up portion 112a and the first portion 111. In the outer peripheral surface of the outer ring body 11, a difference in height is also formed in a boundary part between the lower build-up portion 112b and the first portion 111.

In a vertical section of the outer ring 1, a part of a surface of the upper build-up portion 112a on the inner side has a shape that is generally parallel to the axial center X of the hub unit 10. In the vertical section of the outer ring 1, a part of the surface of the upper build-up portion 112a on the outer side has a shape inclined towards the first portion 111 and also downwardly (radially inwardly). In the vertical section of the outer ring 1, the upper surface of the first portion 111 has a shape generally parallel to the axial center X of the hub unit 10. In a view of the vertical section of the outer ring 1, there is a plurality of positions where a direction of the surface changes, and these positions are disposed on the upper surface of the outer ring body 11 on the outer side of the outer ring flange 12. A shape including one position or more where a direction of a surface changes is referred to as a discontinuous shape.

In the vertical section of the outer ring 1, a part of a surface of the lower build-up portion 112b on the inner side has a shape that is generally parallel to the axial center X of the hub unit 10, and a part of the surface of the lower build-up portion 112b on the outer side has a shape that is inclined towards the first portion 111 and also upwardly (radially inwardly). In the vertical section of the outer ring 1, a lower surface of the first portion 111 has a shape generally parallel to the axial center X of the hub unit 10. Therefore, in a view of the vertical section of the outer ring 1, the lower surface of the outer ring body 11 has a discontinuous shape within a range on the outer side of the outer ring flange 12.

The upper build-up portion 112a extends to the outer side from the outer ring flange 12 in the upper part of the second portion 112. An end on the inner side of the upper build-up portion 112a is positioned on the surface on the outer side of the outer ring flange 12. An end on the outer side of the upper build-up portion 112a is positioned on the inner side of the first portion 111.

The end of the upper build-up portion 112a on the outer side may be positioned within a range A1. The range A1 is a range on the outer peripheral surface of the outer ring body 11 between a first position P1 and a second position P2 in the axis direction.

In the vertical section of the outer ring 1, the first position P1 is a position where a first straight line L1 and the outer peripheral surface of the outer ring body 11 intersect. In the vertical section of the outer ring 1, the second position P2 is a position where a second straight line L2 and the outer peripheral surface of the outer ring body 11 intersect. In a vertical sectional view of the outer ring 1, the first straight line L1 intersects a third straight line L3, which passes the center of the rolling element 41 and is perpendicular to the axial center X of the hub unit 10, thereby forming a contact angle $\theta$ of the rolling element 41. In a vertical sectional view of the outer ring 1, the second straight line L2 passes an end on the outer side of the rolling element 41 and extends perpendicularly to the axial center X of the hub unit 10. The second straight line L2 is a tangential line in the end of the rolling element 41 on the outer side.

In the lower part of the second portion 112, the lower build-up portion 112b extends from the outer ring flange 12 to the outer side. An end on the inner side of the lower build-up portion 112b is positioned on a surface of the outer ring flange 12 on the outer side. The end of the lower build-up portion 112b on the outer side may be positioned on the inner side of the first portion 111. An end on the outer side of the lower build-up portion 112b may be positioned within the range A1 similarly to the upper build-up portion 112a.

Hereinafter, with reference to FIG. 2, structures of the upper build-up portion 112a and the lower build-up portion 112b are explained in more detail. FIG. 2 is a view of the outer ring 1 seen from the outer side.

The upper build-up portion 112a and the lower build-up portion 112b have larger radial dimensions (thicknesses) compared to those of the rest of the second portion 112 of the outer ring body 11. A thickness T1 of the upper build-up portion 112a and a thickness T2 of the lower build-up portion 112b are larger than a thickness T3 of both side parts of the second portion 112. The both side parts of the second portion 112 are parts of the second portion 112, which are positioned on the front side and the rear side in a traveling direction of the vehicle on which the hub unit 10 (FIG. 1) is mounted.

The thickness T1 of the upper build-up portion 112a is not particularly limited, but may be, for example, at least 1.2 times larger than the thickness T3 of the side parts of the second portion 112 at the same position in the axis direction. The thickness T1 of the upper build-up portion 112a may be at most 2.5 times larger than the thickness T3 of the side parts of the second portion 112 at the same position in the axis direction. The thickness T1 is a maximum thickness of the upper build-up portion 112a.

Similarly to the upper build-up portion 112a, the thickness T2 of the lower build-up portion 112b may be at least 1.2 times larger than the thickness T3 of the side parts of the second portion 112 at the same position in the axis direction. The thickness T2 of the lower build-up portion 112b may be at most 2.5 times larger than the thickness T3 of the side parts of the second portion 112 at the same position in the axis direction. The thickness T2 is a maximum thickness of the lower build-up portion 112b.

An upper end E2 of the upper build-up portion 112a is higher than an upper end E1 of the first portion 111 of the outer ring body 11. This means that, in the outer peripheral surface of the outer ring body 11, a difference in height is made between the first portion 111 and the second portion 112. The upper surface of the second portion 112 is disposed at a position higher than the upper surface of the first portion 111, and is connected with the upper surface of the first portion 111 by the upper build-up portion 112a through a part of the second portion 112 where the difference in height is made.

In a circumferential direction of the outer ring 1, a range A2 that forms the upper build-up portion 112a may be ±20° or larger around a fourth straight line L4 that is perpendicular to the axial center X in a view of the outer ring 1 from the outer side, and may also be ±40° or larger around the fourth straight line L4. This means that the range A2 of the upper build-up portion 112a in the circumferential direction may be 40° or larger, or a range of 80° or larger as a whole. The range A2 of the upper build-up portion 112a in the circumferential direction may be ±60° or smaller around the fourth straight line L4, or a range of 120° or smaller as a whole. In the circumferential direction of the outer ring 1, a range where the lower build-up portion 112b is formed may be similar to that of the upper build-up portion 112a.

Shapes of the upper build-up portion 112a and the lower build-up portion 112b are not particularly limited. For example, the upper build-up portion 112a and the lower build-up portion 112b may be formed so that their outer surfaces are made of one or more types of plane surface, one or more types of tapered surface and/or one or more types of curved surface.

The outer surfaces of the upper build-up portion 112a and the lower build-up portion 112b may continue smoothly to the outer surfaces of side parts of the outer ring body 11, respectively. To improve the performance of draining, the upper build-up portion 112a may have a shape where a center part in the front-rear direction in the vehicle traveling direction is elevated more than the remaining part. The lower build-up portion 112b may also have a shape in which a center part in the front-rear direction is positioned lower than the remaining part.

The outer ring 1 according to this embodiment may be manufactured by, for example, forging and so on, similarly to a conventional outer ring.

Hereinafter, explanation of the hub unit 10 continues with reference to FIG. 1. As shown in FIG. 1, the inner shaft 2 is provided with an inner shaft body 21 and an inner shaft flange 22.

The inner shaft body 21 has a generally columnar shape in which the straight line X serves as its axial center. The inner shaft body 21 is inserted into the outer ring body 11. The inner shaft body 21 is disposed coaxially to the outer ring body 11. A raceway surface 231 is provided on an outer peripheral surface of the inner shaft body 21. The raceway surface 231 is a ring-shaped surface in which the straight line X serves as its axial center. The raceway surface 231 faces the raceway surface 131 of the outer ring body 11.

The inner shaft flange 22 protrudes radially outwardly from the outer peripheral surface of the inner shaft body 21. The inner shaft flange 22 has a generally ring shape in which the straight line X serves as its axial center. A disc wheel, a brake disc and so on (not shown) are mounted on the inner shaft flange 22.

The inner ring 3 has a cylindrical shape in which the straight line X serves as its axial center. The inner ring 3 is fixed to the inner shaft body 21. The inner ring 3 is installed on an outer peripheral surface of the inner shaft body 21 in an end part on the inner side of the inner shaft 2. The end part of the inner shaft body 21 on the inner side is swaged radially outwardly, and is in contact with an end surface on the inner side of the inner ring 3. This means that the inner ring 3 is fixed to the inner shaft body 21 by crimping. The inner ring 3 may also be fixed to the inner shaft body 21 by press-fitting the inner shaft body 21 to the inner ring 3.

A raceway surface 32 is provided on an outer peripheral surface of the inner ring 3. The raceway surface 32 is a ring-shaped surface in which the straight line X serves as its axial center. The raceway surface 32 faces the raceway surface 132 of the outer ring body 11.

A bearing space S is formed between the outer ring body 11 and the inner shaft body 21 to which the inner ring 3 is fixed. The plurality of rolling elements 41 and the plurality of rolling elements 42 are disposed inside the bearing space S. The plurality of rolling elements 41 is arrayed into an annular shape about the straight line X. The plurality of rolling elements 42 is arrayed into an annular shape about the straight line X. The plurality of rolling elements 42 is disposed on the inner side of the rolling elements 41.

The plurality of rolling elements 41 is disposed on the outer side of the outer ring flange 12. The plurality of rolling elements 41 is in contact with the raceway surface 131 of the outer ring body 11 and the raceway surface 231 of the inner shaft body 21. The plurality of rolling elements 42 is in contact with the raceway surface 132 of the outer ring body 11 and the raceway surface 32 of the inner ring 3.

As stated above, in a vertical sectional view of the hub unit 10, the contact angle θ of the rolling element 41 with respect to the outer ring body 11 and the inner shaft body 21 is an angle formed by the first straight line L1 and the third straight line L3. The direction in which the first straight line L1 extends is a direction of a load acting between the outer ring body 11 and the inner shaft body 21, and the rolling element 41. For example, the first straight line L1 may pass a point where the rolling element 41 is in contact with the outer ring body 11, and a point where the rolling element 41 is in contact with the inner shaft body 21.

The sealing device 5 has a generally ring shape in which the straight line X serves as its axial center. The sealing device 5 is mounted between the first portion 111 of the outer ring body 11 and the inner shaft body 21. The sealing device 5 seals an end part on the outer side of the bearing space S. The cap 6 seals an end part on the inner side of the bearing space S. However, a sealing device similar to the sealing device 5 may seal the end part of the bearing space S on the inner side.

FIG. 3 is an exploded perspective view of the hub unit 10 shown in FIG. 1. Namely, FIG. 3 is a view of a state where the inner shaft 2 is separated from the hub unit 10. In the drawing, the inner shaft 2 is shown on the left side. In the drawing, the right side shows a state where the inner shaft 2 is removed from the hub unit 10. This means that the drawing on the right side shows a state where the outer ring 1, the inner ring 3, the rolling elements 41, 42, and so on are assembled.

As shown in the drawing, the upper build-up portion 112a is formed in the second portion 112 of the upper part of the outer ring 1. Therefore, the difference in height is formed from the upper build-up portion 112a towards the first portion 111. As stated above, the upper part of the outer ring 1 has a shape including a discontinuous surface.

With the hub unit 10 according to this embodiment, the upper build-up portion 112a is formed in the second portion 112 of the outer ring body 11. However, the upper build-up portion 112a is not formed in the first portion 111 of the outer ring body 11. The upper end E2 of the upper build-up portion 112a is positioned higher than the upper end E1 of the first portion 111 of the outer ring body 11. Because of this, on the upper surface of the outer ring body 11, the discontinuous part is formed between the second portion 112 and the first portion 111, in which the direction of the surface changes. With the upper surface shape of the outer ring body 11, when water running along a knuckle and so on flows towards the first portion 111 from the second portion 112 on the upper surface of the outer ring body 11, force of water is reduced in the foregoing discontinuous part. Thus, with the upper surface shape of the outer ring body 11, it is possible to lower water flow speed. This makes it more likely that water falls down from the upper surface of the outer ring body 11, thereby reducing an amount of water reaching the sealing device 5. As a result, the hub unit according to this embodiment is able to restrain water from entering the bearing space S.

With the hub unit 10 according to this embodiment, the upper build-up portion 112a and the lower build-up portion 112b having large thicknesses are formed in the outer ring body 11. Therefore, it is possible to improve rigidity of the outer ring 1.

With the hub unit 10 according to this embodiment, the upper build-up portion 112a having a large thickness extends to the outer side beyond the first straight line L1. A direction of the first straight line L1 is a direction of a load from the rolling element 41 applied to the outer ring body 11.

In a part of the outer ring body 11, which bears a load from the rolling element 41, the upper build-up portion 112*a* is formed. Thus, the part is strengthened. Therefore, it is possible to improve rigidity of the outer ring 1 against a load from the rolling elements 41.

In the hub unit 10 according to this embodiment, the upper build-up portion 112*a* having a large thickness does not extend to the outer side beyond the rolling element 41. This means that the upper build-up portion 112*a* is not provided in a part of the outer ring body 11, which does not contribute much to improvement of rigidity against a load from the rolling element 41. Therefore, it is possible to restrain a mass increase of the outer ring 1 and the hub unit 10 while improving rigidity of the outer ring 1 against a load from the rolling element 41.

Figure 4:
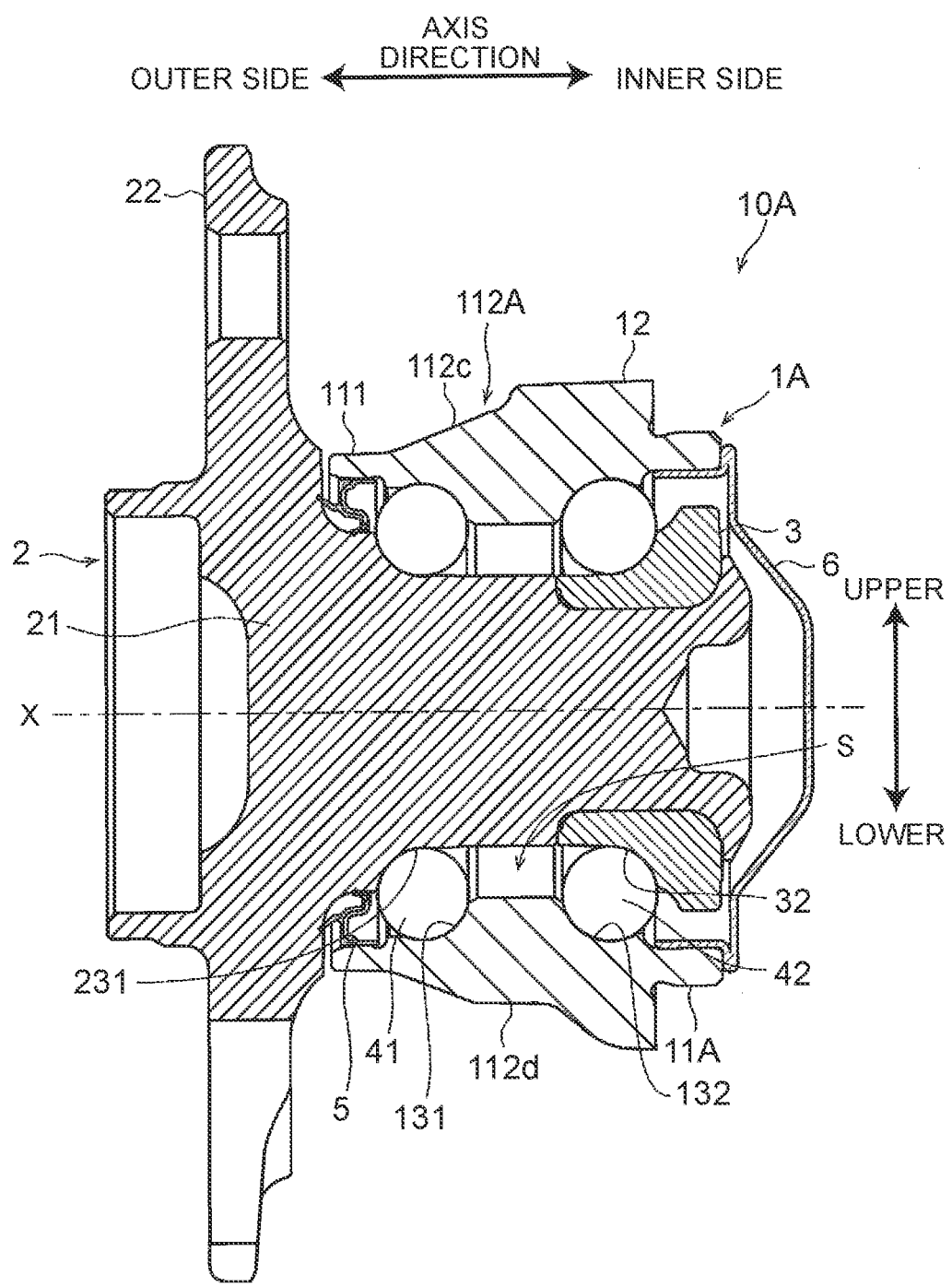
FIG. 4 is a sectional view showing a general structure of a hub unit according to the second embodiment, the sectional view being taken along a plane including a straight line, which is an axial center of the hub unit.
Figure 5:
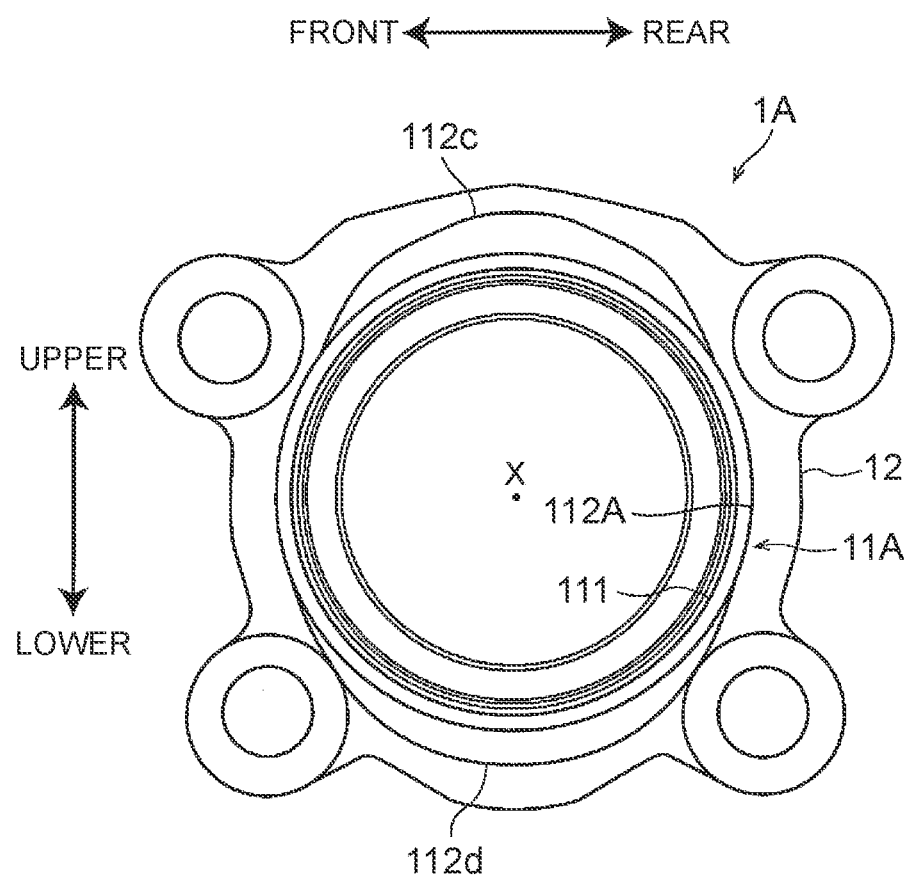
FIG. 5 is a view of an outer ring provided in the hub unit shown in FIG. 4, seen from an outer side of a vehicle.

FIG. 4 is a vertical sectional view of a hub unit 10A according to the second embodiment. FIG. 5 is a view of an outer ring 1A of the hub unit 10A seen from an outer side. A basic structure of the hub unit 10A is equal to the basic structure of the hub unit 10 according to the first embodiment. However, the hub unit 10A is different form the hub unit 10 according to the first embodiment in a structure of a second portion 112A of an outer ring body 11A.

As shown in FIG. 4 and FIG. 5, similarly to the first embodiment, an upper build-up portion 112*c* and a lower build-up portion 112*d* are provided in the second portion 112A of the outer ring body 11A. The shape of the upper build-up portion 112*c* is different from the shape of the upper build-up portion 112*a* in the first embodiment. The shape of the lower build-up portion 112*d* is slightly different from that of the lower build-up portion 112*b* in the first embodiment.

In the second embodiment, in a vertical sectional view of the outer ring 1A, a surface of the upper build-up portion 112*c*, or an upper surface of the second portion 112A, is formed into an inclined surface as a whole. In the vertical sectional view of the outer ring 1A, the upper surface of the second portion 112A is inclined gradually towards a first portion 111 side and also downwardly (radially inwardly) as a whole. In the vertical section of the outer ring 1A, an upper surface of the first portion 111 is generally parallel to the axial center X. Therefore, a direction of the upper surface of the outer ring body 11A changes between the second portion 112A and the first portion 111. This means that, similarly to the outer ring body 11 of the first embodiment, the upper surface of the outer ring body 11A has a discontinuous shape within a range on the outer side of an outer ring flange 12.

Figure 6:
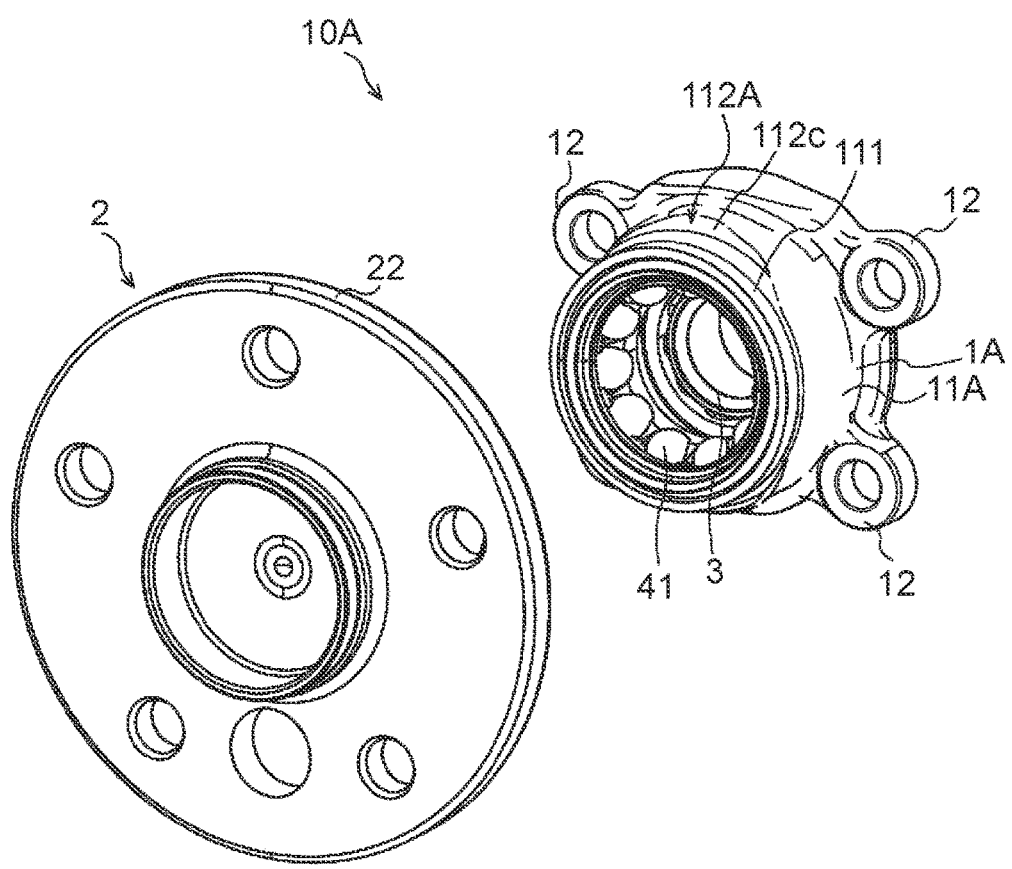
FIG. 6 is a perspective view of a state where an inner shaft is separated from the hub unit shown in FIG. 4.

FIG. 6 is an exploded perspective view of the hub unit 10A shown in FIG. 4. This means that FIG. 6 is a view of a state where the inner shaft 2 is separated from the hub unit 10A. In the drawing, the inner shaft 2 is shown on the left side. In the drawing, the right side shows a state where the inner shaft 2 is removed from the hub unit 10A. This means that the drawing on the right side shows a state where the outer ring 1A, the inner ring 3, the rolling elements 41, 42, and so on are assembled.

As shown in the drawing, the upper build-up portion 112*c* is formed in the second portion 112A of the upper part of the outer ring 1A. The upper build-up portion 112*c* forms an inclined surface that is inclined downward towards the first portion 111. As stated above, the upper part of the outer ring 1A has a shape including a discontinuous surface.

In this embodiment, the discontinuous part is formed on the upper surface of the outer ring body 11A between the second portion 112A and the first portion 111. The discontinuous part is able to reduce force of water flowing on the upper surface of the outer ring body 11A, and makes water fall from the outer ring body 11A more easily. Therefore, the hub unit according to this embodiment is able to reduce an amount of water reaching a sealing device 5, thereby restraining water from entering a bearing space S.

Figure 7:
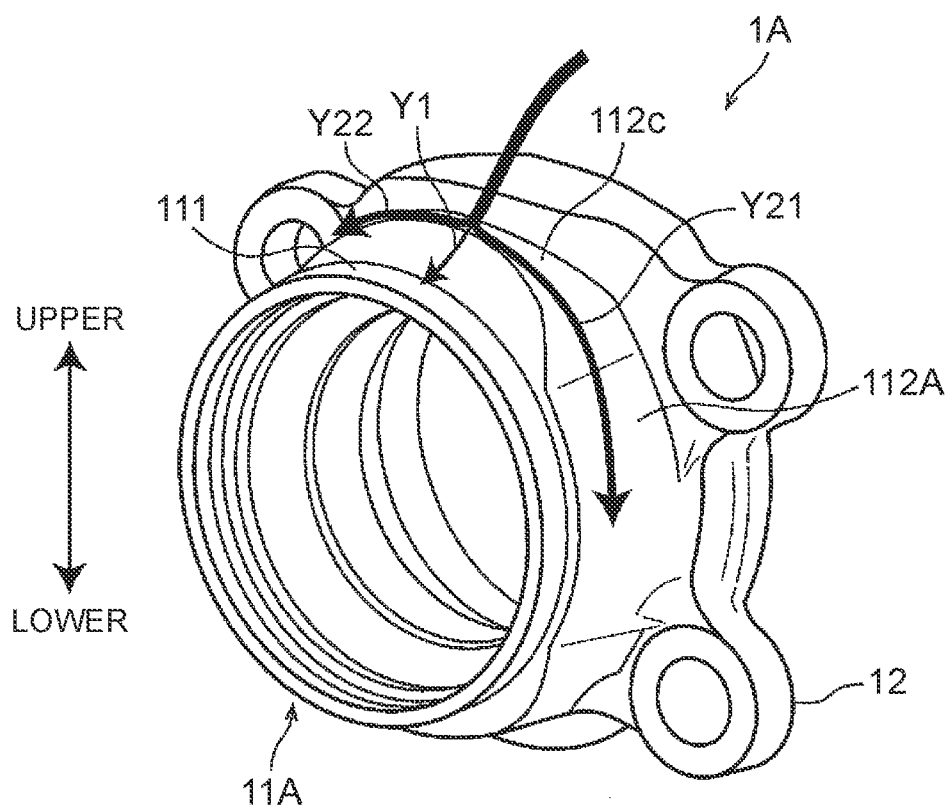
FIG. 7 is a perspective view of the outer ring shown in FIG. 5.

With reference to FIG. 7, effects of the hub unit 10A according to the second embodiment are explained more specifically. As described above, the basic structure of the hub unit 10A according to the second embodiment is similar to the basic structure of the hub unit 10 according to the first embodiment. Therefore, the effects explained below are also obtained in the hub unit 10 according to the first embodiment.

FIG. 7 is a perspective view of the outer ring 1A. As shown by an arrow Y1 in FIG. 7, water running along a knuckle and so on flows on the upper surface of the outer ring body 11A towards the first portion 111 from the second portion 112A, and hits the upper surface of the first portion 111 and gets an impact. Because of this, force of water is reduced, making it more likely that water falls down from the upper surface of the outer ring body 11A. Therefore, with the hub unit according to this embodiment, water reaching the sealing device 5 is reduced, thus, it is able to restrain water from entering the bearing space S.

Also, as shown by arrows Y21 and Y22, water flowing on the outer ring body 11A is divided by the upper build-up portion 112*c* in a circumferential direction before reaching the first portion 111. Because of this, an amount of water reaching the first portion 111 or the sealing device 5 is reduced. Therefore, the hub unit according to this embodiment is able to restrain water from entering the bearing space S.

Figure 8:
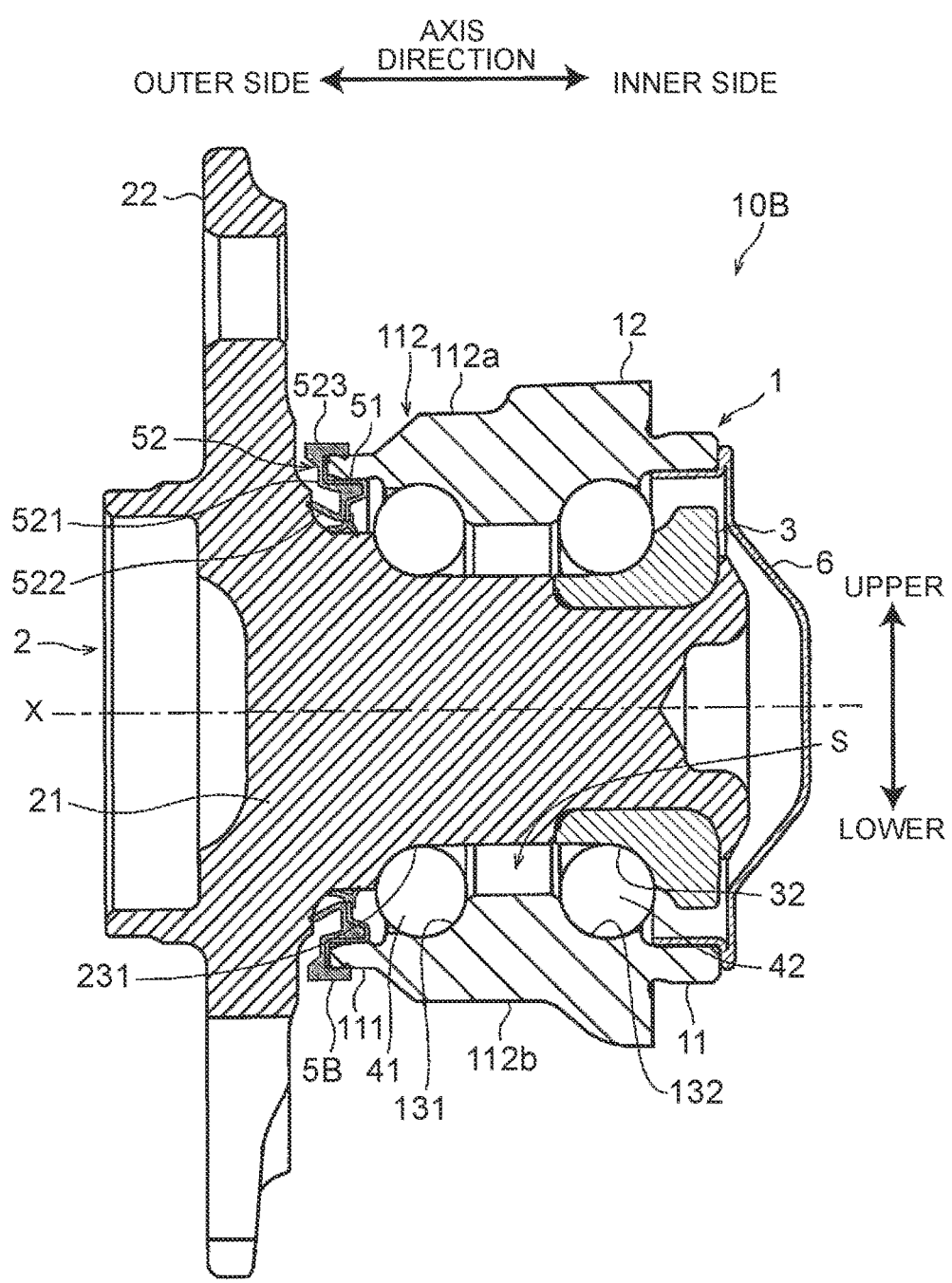
FIG. 8 is a sectional view showing a general structure of a hub unit according to the third embodiment, the sectional view being taken along a plane including a straight line, which is an axial center of the hub unit.

FIG. 8 is a vertical sectional view of a hub unit 10B according to the third embodiment. The hub unit 10B has a similar structure to that of the hub unit 10 according to the first embodiment, except for a structure of a sealing device 5B. The sealing device 5B is applicable to the hub unit 10A according to the second embodiment. In this embodiment, the structure of the sealing device 5B is explained in detail.

The entire sealing device 5 according to the first embodiment is disposed between the outer ring body 11 and the inner shaft body 21. On the other hand, a part of the sealing device 5B according to this embodiment is disposed on a radially outer side of an outer ring body 11. An outer peripheral portion of the sealing device 5B extends on an outer peripheral surface of an end part on the outer side of the outer ring body 11.

The sealing device 5B has a core metal 51 and a seal member 52. The core metal 51 is made of metal such as stainless steel. The seal member 52 is made of a material having more elasticity than the core metal 51, such as a rubber-based material.

The core metal 51 has a generally ring shape in which a straight line X serves as its axial center. The core metal 51 is mounted on an inner peripheral surface of a first portion 111 of the outer ring body 11.

The seal member 52 includes a base part 521, a plurality of lip parts 522, and an extended part 523. The base part 521 is adhered to the core metal 51. The base part 521 covers a surface of an outer side of the core metal 51. Each of the lip parts 522 extends from the base part 521 towards an inner shaft 2. The extended part 523 is a part where the base part 521 on top of the core metal 51 is extended towards an outer peripheral surface side of the outer ring body 11. This means that the extended part 523 extends on the outer peripheral surface of the first portion 111 of the outer ring body 11 from an outer peripheral portion of the base part 521. The extended part 523 covers at least a part of the first portion 111 from the outer peripheral side.

In the first portion 111 of the outer ring body 11, or an end part on the outer side of the outer ring body 11, build-up portions such as the upper build-up portion 112a and the lower build-up portion 112b are not formed. This means that the end part of the outer ring body 11 on the outer side is substantially cylindrical. Therefore, the outer peripheral portion of the sealing device 5B is able to be extended to an outer peripheral surface of the end part of the outer ring body 11 on the outer side. Thus, a sealing function of the sealing device 5B improves, and the hub unit according to this embodiment is able to do better in restraining water from entering a bearing space S.

Figure 9:
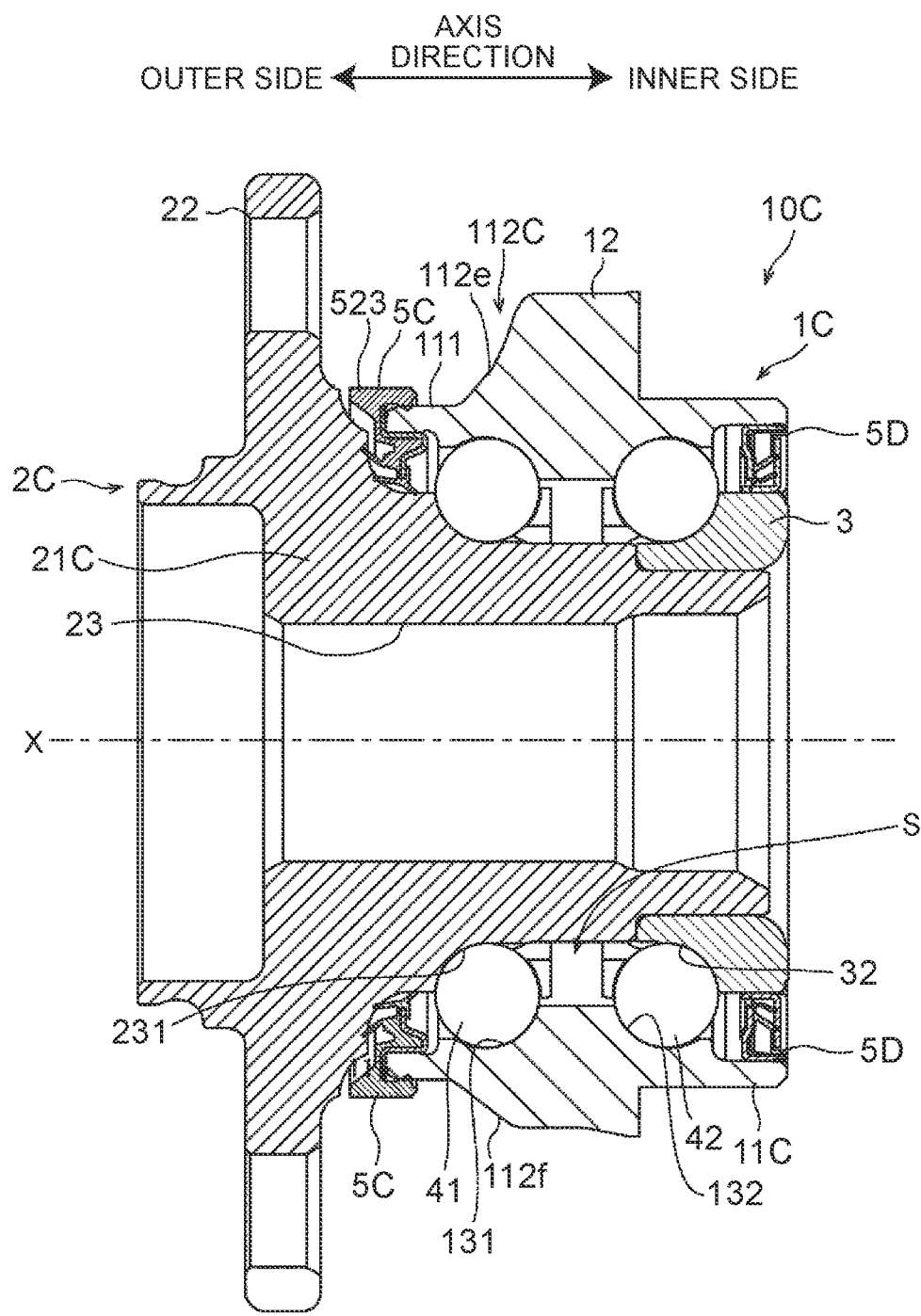
FIG. 9 is a sectional view of a general structure of a hub unit according to the fourth embodiment, the sectional view being taken along a plane including a straight line, which is an axial center of the hub unit.
Figure 10:
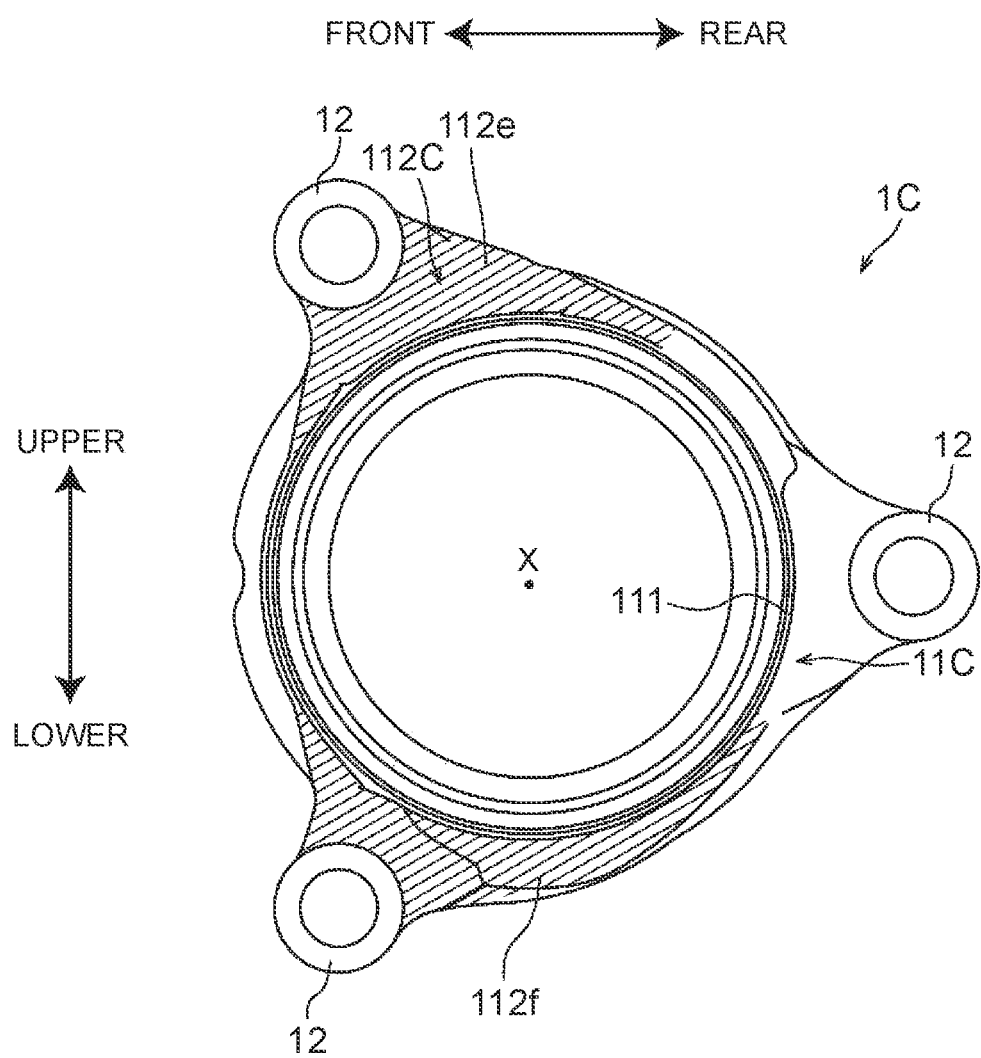
FIG. 10 is a view of an outer ring provided in the hub unit shown in FIG. 9, seen from an outer side of a vehicle.

FIG. 9 is a vertical sectional view of a hub unit 10C according to the fourth embodiment. FIG. 10 is a view of an outer ring 1C provided in the hub unit 10C, seen from an outer side. A basic structure of the hub unit 10C is similar to the basic structure of the hub unit 10 according to the first embodiment. However, structures of the outer ring 1C and an inner shaft 2C included in the hub unit 10C are different from those of the outer ring 1 and the inner shaft 2 according to the first embodiment. Also, a seal structure of the hub unit 10C is different from the seal structure of the hub unit 10 according to the first embodiment. Furthermore, a structure of a second portion 112C of the outer ring 1C in the hub unit 10C is different from that of the hub unit 10 according to the first embodiment.

As shown in FIG. 9, a hollow is made in a shaft center part of the inner shaft 2C provided in the hub unit 10C. In the axial center part of the inner shaft 2C, a shaft insertion hole 23 is provided. The shaft insertion hole 23 goes through the inner shaft 2C in the axis direction. A driving shaft is inserted in the shaft insertion hole 23. As stated above, it is possible to use the hub unit 10C according to this embodiment as a hub unit that supports a driving wheel.

As shown in FIG. 9, in the fourth embodiment, a sealing device 5C is also provided in an end part of an outer side of a bearing space S. Similarly to the sealing device 5B according to the third embodiment, a part of the sealing device 5C is disposed on a radially outer side of an outer ring body 11C. To be specific, an extended part 523 of a seal member of the sealing device 5C extends on an outer peripheral surface of a first portion 111 of the outer ring body 11C. Thus, sealing function of the sealing device 5C improves, and it is thus possible to restrain water from entering the bearing space S more reliably. In the hub unit 10C shown in FIG. 9, unlike the first and the second embodiments, the cap 6 is not provided. In the fourth embodiment, a sealing device 5D is also provided in an end part on an inner side of the bearing space S.

As shown in FIG. 10, three outer ring flanges 12 are provided in an outer peripheral portion of the outer ring 1C. As described in the first embodiment and the second embodiment, the number of the outer ring flanges 12 may be four, and, as described in the fourth embodiment shown in FIG. 10, the number of the outer ring flanges 12 may be three. Thus, the number of the outer ring flanges of the hub unit according to this embodiment is not particularly limited. The number of the outer ring flanges may be selected depending on specifications of a vehicle body, a wheel, and so on.

As shown in FIG. 9 and FIG. 10, similarly to the first embodiment, an upper build-up portion 112e and a lower build-up portion 112f are provided in the second portion 112C of the outer ring body 11C. A shape of the upper build-up portion 112e is similar to the shape of the upper build-up portion 112c of the second embodiment. A shape of the lower build-up portion 112f is similar to that of the lower build-up portion 112d of the second embodiment. In FIG. 10, a thick part is shown as a hatched region.

In the fourth embodiment, similarly to the second embodiment, a surface of the upper build-up portion 112e, in other words, an upper surface of the second portion 112C, forms an inclined surface as a whole in a vertical sectional view of the outer ring 1C. In the vertical section of the outer ring 1C, the upper surface of the second portion 112C is inclined towards the first portion 111 side and also downwardly (radially inwardly) as a whole. In the fourth embodiment, an inclination angle of the second portion 112C is larger than an inclination angle of the second portion 112A of the second embodiment. In the vertical section of the outer ring 1C, the upper surface of the first portion 111 is generally parallel to the axis direction. Therefore, on the upper surface of the outer ring body 11C, the direction of the surface changes between the second portion 112C and the first portion 111. This means that, similarly to the outer ring body according to the first and second embodiments, the upper surface of the outer ring body 11C has a discontinuous shape in a range on the outer side of the outer ring flange 12.

Figure 11:
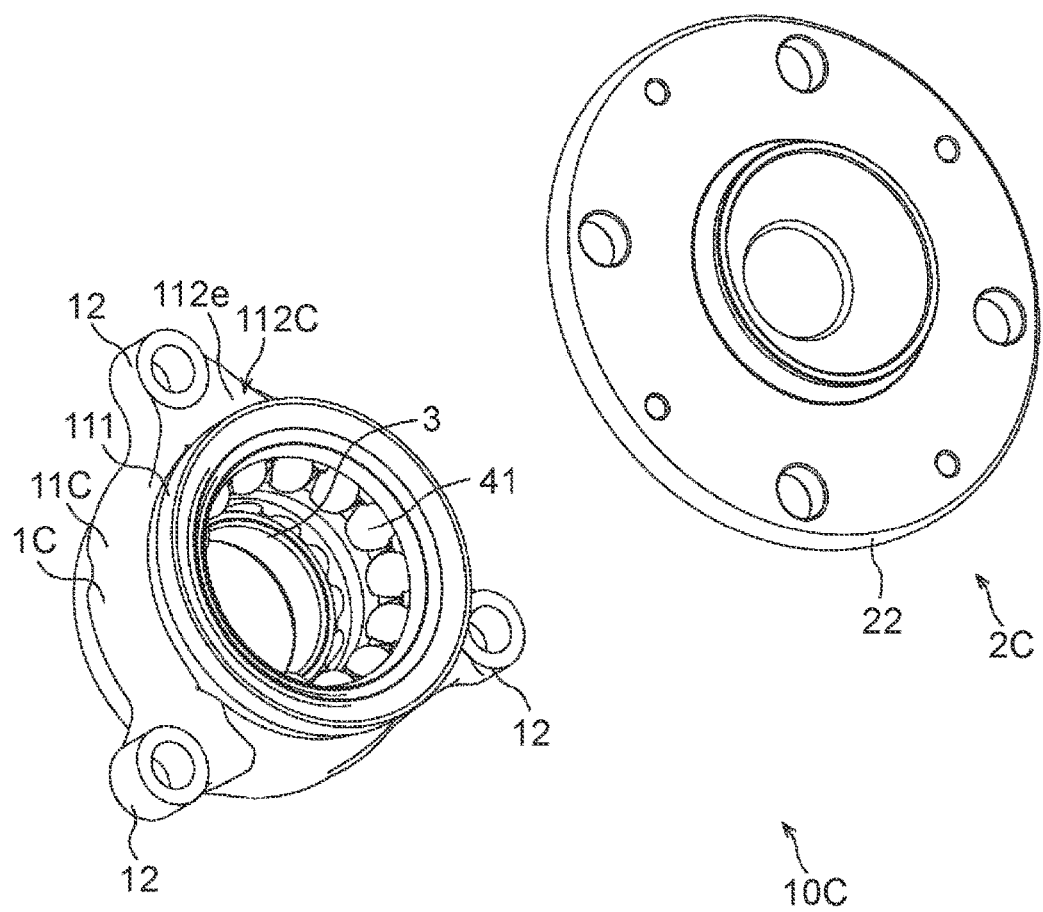
FIG. 11 is a perspective view of a state where an inner shaft is separated from the hub unit shown in FIG. 9.

FIG. 11 is an exploded perspective view of the hub unit 10C shown in FIG. 9. This means that, FIG. 11 is a view of a state where the inner shaft 2C is separated from the hub unit 10C. In this drawing, the inner shaft 2C is shown on the right side. In the drawing, the left side shows a state where the inner shaft 2C is removed from the hub unit 10C. This means that the drawing on the left side shows a state where the outer ring 1C, the inner ring 3, the rolling elements 41, 42 and so on are assembled.

As shown in the drawing, the upper build-up portion 112e is formed in the second portion 112C in the upper part of the outer ring 1C. The upper build-up portion 112e forms an inclined surface that is inclined downwardly towards the first portion 111. As stated above, the upper part of the outer ring 1C has a shape including a discontinuous surface.

In this embodiment, a discontinuous part is also formed on the upper surface of the outer ring body 11C between the second portion 112C and the first portion 111. Because of the discontinuous part, force of water flowing on the upper surface of the outer ring body 11C is reduced, and falling of water from the outer ring body 11C is facilitated. Thus, it is possible to reduce water that reaches the sealing device 5, making it possible to restrain water from entering the bearing space S.

Although the embodiments are explained above, the disclosure is not limited to the foregoing embodiments, and various changes may be made without departing from the gist of the disclosure.

For example, in each of the foregoing embodiments, the build-up parts are formed in the upper part and the lower part of the outer ring body. However, the build-up part may not be formed in the lower part of the outer ring body.

What is claimed is:
1. A hub unit mounted on a vehicle, comprising:
an outer ring including a cylindrical outer ring body and an outer ring flange, the outer ring flange protruding radially outwardly from the outer ring body;
an inner shaft including an inner shaft body and an inner shaft flange, the inner shaft body being inserted into the outer ring body, the inner shaft flange protruding radially outwardly from the inner shaft body, and the inner shaft flange being disposed on an outer side of the outer ring flange;

a plurality of rolling elements disposed inside a bearing space which is formed between the outer ring body and the inner shaft body; and a sealing device that seals an end part of the bearing space, wherein:

the outer side is an outer side in a vehicle width direction in a state where the hub unit is mounted on the vehicle;

the outer ring body includes a first portion and a second portion;

the first portion is an end part on the outer side of the outer ring body;

the second portion is a part of the outer ring body between the first portion and the outer ring flange;

the second portion includes an upper build-up portion in an upper region of the outer ring body between opposing side parts of the second portion;

the upper build-up portion is formed in an upper part of the second portion so that a thickness of the upper part of the second portion is larger than thicknesses of the side parts of the second portion in the state where the hub unit is mounted on the vehicle; and an upper end of the upper build-up portion is higher than an upper end of the first portion in the state where the hub unit is mounted on the vehicle.

2. The hub unit according to claim 1, wherein:

an upper surface of the first portion has a shape generally parallel to an axial center of the hub unit in a sectional view being taken along a plane including a straight line which is an axial center of the hub unit; and a surface of an outer side part of the upper build-up portion has a shape radially inwardly inclined towards the first portion in a sectional view being taken along a plane including a straight line which is an axial center of the hub unit.

3. The hub unit according to claim 1, wherein an end on the outer side of the upper build-up portion is disposed on an outer peripheral surface of the outer ring body within a range between a first position and a second position;

the first position is a position where a first straight line and the outer peripheral surface of the outer ring body intersect in a sectional plane including an axial center of the hub unit;

the second position is a position on the outer side of the first position and is a position where a second straight line and the outer peripheral surface of the outer ring body intersect in the sectional plane including the axial center of the hub unit;

the plurality of rolling elements includes rolling elements disposed on an outer side of outer ring flange;

the first straight line forms a contact angle of each of the rolling elements disposed on the outer side of outer ring flange with a straight line which is perpendicular to the axial center of the hub unit; and the second straight line passes an outermost circumferential surface on the outer side of each of the rolling elements and is perpendicular to the axial center of the hub unit.

4. The hub unit according to claim 1, wherein:

the second portion further includes a lower build-up portion in a lower region of the outer ring body between the opposing side parts of the second portion; and the lower build-up portion is formed in a lower part of the second portion so that a thickness of the lower part of the second portion is larger than thicknesses of side parts of the second portion in the state where the hub unit is mounted on the vehicle.

5. The hub unit according to claim 1, wherein an outer peripheral portion of the sealing device extends on an outer peripheral surface of the first portion.

\* \* \* \* \*

UNITED STATES PATENT AND TRADEMARK OFFICE
CERTIFICATE OF CORRECTION

PATENT NO. : 10,180,160 B2
APPLICATION NO. : 15/686642
DATED : January 15, 2019
INVENTOR(S) : Yuya Inoue et al.

It is certified that error appears in the above-identified patent and that said Letters Patent is hereby corrected as shown below:

On the Title Page

Column 1, item (30):
Please change "Sep. 2, 2016 (JP) ..... 2016-171418" to --Sep. 2, 2016 (JP) ..... 2016-171419--

Signed and Sealed this
Thirtieth Day of July, 2019

Andrei Iancu
*Director of the United States Patent and Trademark Office*